No. 12,120. REISSUED JUNE 16. 1903.

D. KOPS.

CORSET.

APPLICATION FILED JULY 14, 1902.

8 SHEETS—SHEET 1.

Witnesses:
J. Stair
Chas. H. Smith

Inventor:
Daniel Kops
per L. W. Serrell & Son Attys.

THE NORRIS PETERS CO., PHOTO-LITHO., WASHINGTON, D. C.

No. 12,120. REISSUED JUNE 16, 1903.
D. KOPS.
CORSET.
APPLICATION FILED JULY 14, 1902.
3 SHEETS—SHEET 2.
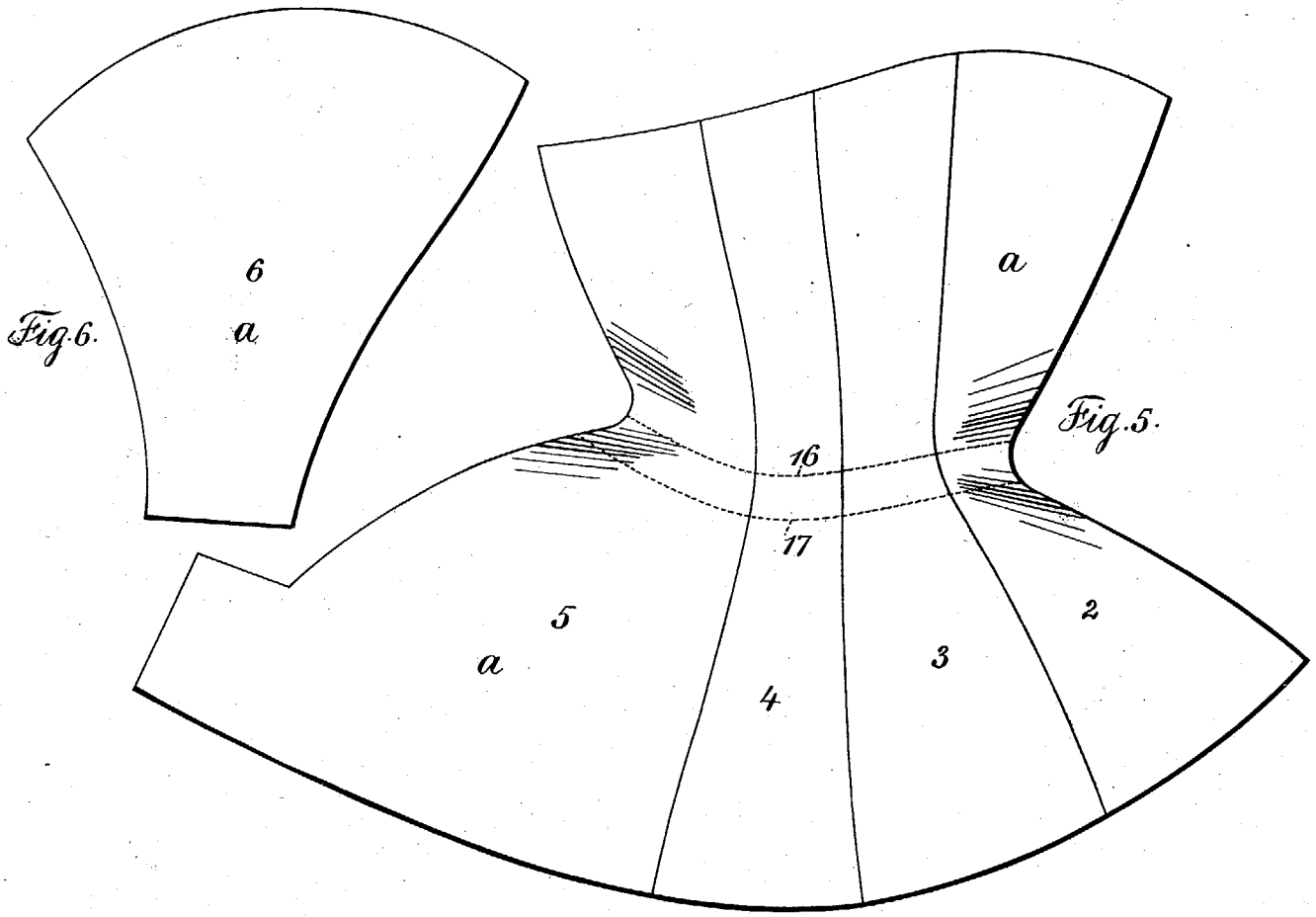
Witnesses:
J. Stair
Chas. H. Smith
Inventor:
Daniel Kops
per L. W. Serrell & Son
Attys.
THE NORRIS PETERS CO., PHOTO-LITHO., WASHINGTON, D. C.

No. 12,120. REISSUED JUNE 16, 1903.
D. KOPS.
CORSET.
APPLICATION FILED JULY 14, 1902.
3 SHEETS—SHEET 3.
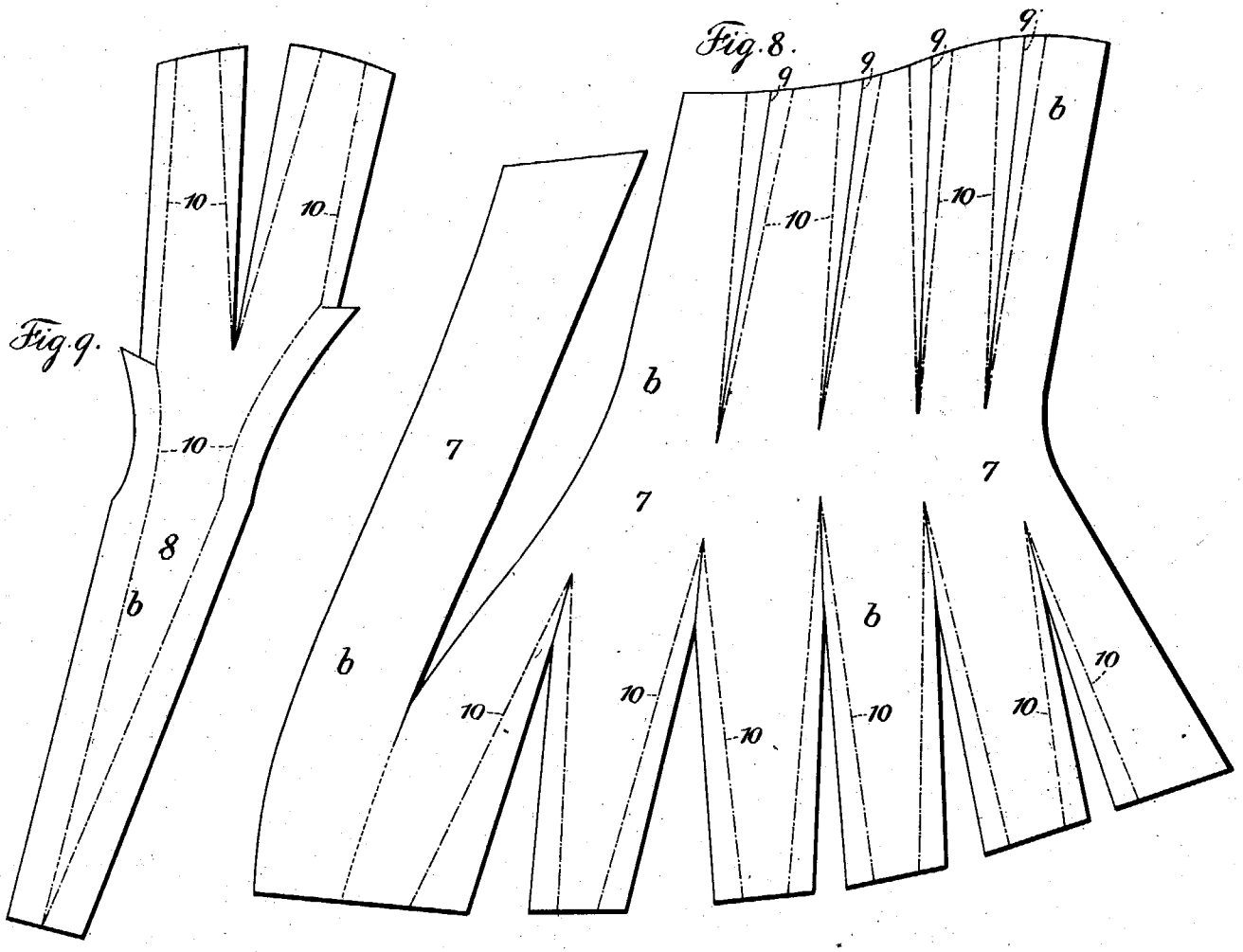
Witnesses:
J. Stair
Chas. H. Smith
Inventor:
Daniel Kops
per L. N. Terrell & Son
Attys.
THE NORRIS PETERS CO., PHOTO-LITHO., WASHINGTON, D. C.

No. 12,120. Reissued June 16, 1903.

UNITED STATES PATENT OFFICE.

DANIEL KOPS, OF NEW YORK, N. Y.

CORSET.

SPECIFICATION forming part of Reissued Letters Patent No. 12,120, dated June 16, 1903.

Original No. 694,160, dated February 25, 1902. Application for reissue filed July 14, 1902. Serial No. 115,605.

*To all whom it may concern:*

Be it known that I, DANIEL KOPS, a citizen of the United States, residing in the borough of Manhattan, in the city, county, and State of New York, have invented an Improvement in Corsets, of which the following is a specification.

The object of my present invention is to produce a light-weight corset flexible circumferentially and vertically and possessing the requisite strength and firmness vertically and at the waist-line and a corset of such form as to present a smooth exterior and to carry the bones in pockets upon the under surface and at the same time prevent their ends protruding.

In carrying out my invention I employ a single-ply light-weight fabric of shaped connected sections and an overlying fabric of heavier weight that is continuous around the waist-line and that extends vertically between the top and bottom edges at the lines of the bones, but which is absent between the same, thus forming series of upward and downward fingers with intervening V-shaped incisions, at which places only the light-weight fabric is in evidence. The fingers of the series have edges inwardly folded, the folds being of increasing width and appreciably overlapping at the extreme ends, which ends come adjacent to the ends of the bones and bone-pockets, and at this place I also prefer to employ, in connection with the bones and the strips forming the bone-pockets, double-thickness or reinforce strips inserted between the bones and the strips forming the bone-pockets.

Figure 2:
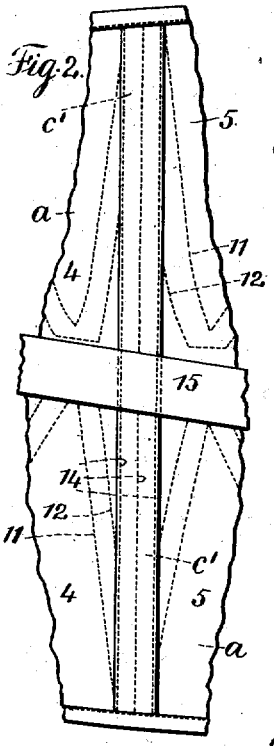
Figure 1:
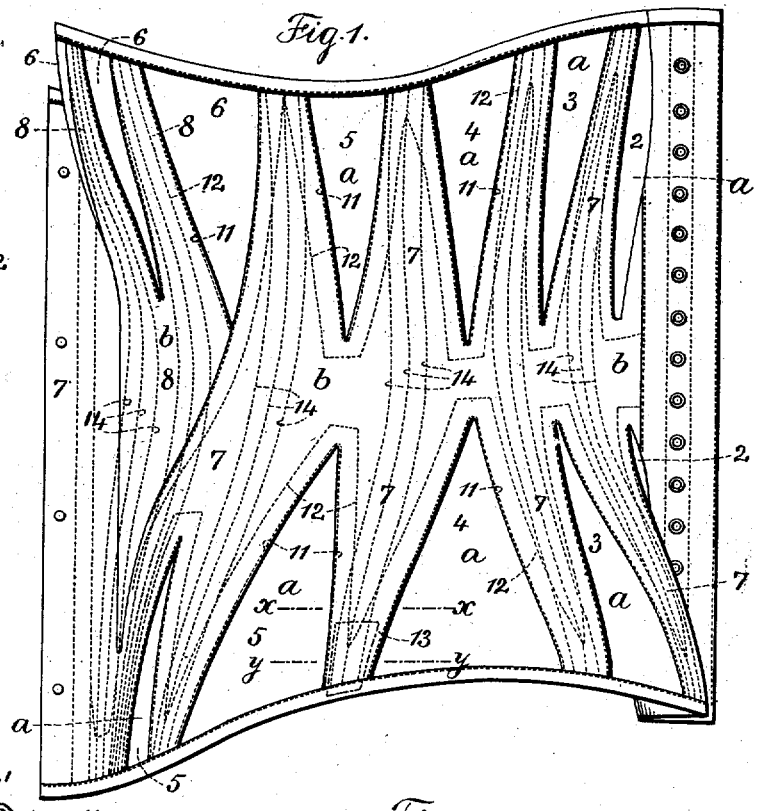
Figure 3:
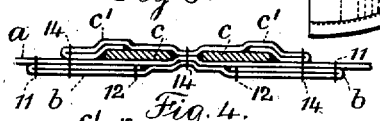
Figure 4:
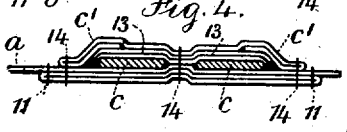
Figure 7:
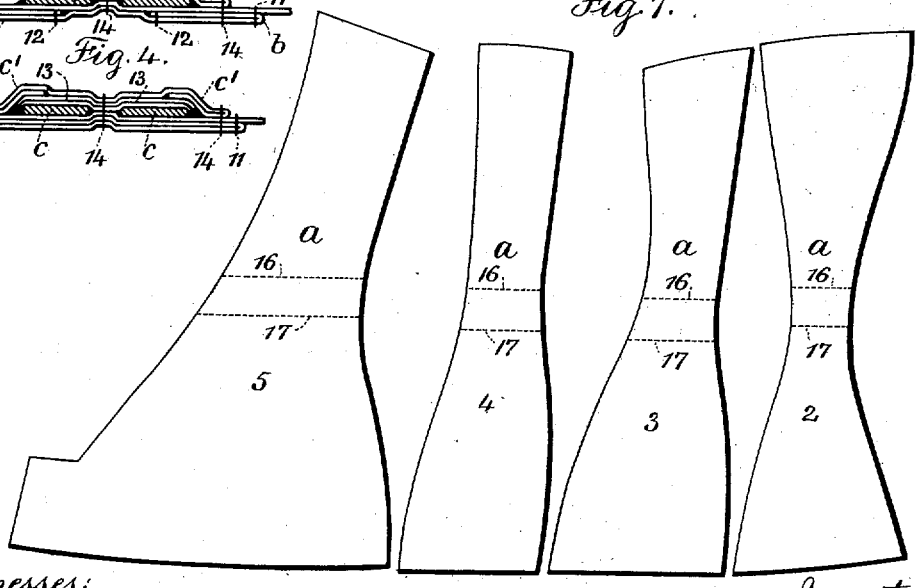

In the drawings, Figure 1 is an elevation representing one-half of a corset illustrating my invention. Fig. 2 is an elevation of the under or inner surface of a portion of said corset. Fig. 3 is a cross-section at *x x* of Fig. 1, and Fig. 4 is a cross-section at *y y* of Fig. 1. Fig. 5 is a plan of four of the parts going to make up the light-weight fabric as connected together by sewing. Fig. 6 is a plan of the other part of the light-weight fabric to be connected to the left-hand side of the parts shown in Fig. 5, and Fig. 7 is a plan of the four connected parts shown in Fig. 5 separately. Fig. 8 is a plan of one part of the overlying fabric as cut to shape, and Fig. 9 is a plan of the other part of the overlying fabric as cut to shape. Figs. 3, 4, 5, 6, 8, and 9 are shown of exaggerated size for clearness.

The single-ply light-weight fabric *a* is preferably formed of the shaped parts 2, 3, 4, 5, and 6. Fig. 7 shows the parts 2, 3, 4, and 5 separate. Fig. 5 shows the parts 2, 3, 4, and 5 as connected at their meeting edges. These parts and the part 6 are so shaped before being connected by sewing that when connected they have the form of one side or half of the figure. The overlying or heavy fabric *b* composing the surface of the corset is of two parts, one main part 7 and a part 8. The part 7 is shown alone in Fig. 8 provided with incisions upon the lines 9 from the upper edge toward the waist portion and with V-shaped incisions from the lower edge up toward the waist portion and with a portion at the left-hand that is almost separated from the other portion, and between these portions of the main part 7 the part 8, Fig. 9, is inserted as a gore, and there is a V-shaped incision in the upper edge of this part 8.

In Figs. 8 and 9 the dotted lines 10, adjacent to the edges of the incisions and V-shaped incisions, are the lines upon which the portions of the fabric are folded, and it will be noticed that these lines taper in relation to the edges of the fabric, being widest at the top and bottom edges of the corset and of sufficient width that when the parts are folded on these lines the fabric at the extreme ends will meet or appreciably overlap, these lines of incisions forming of the main part 7 series of upward and downward fingers. It is also apparent that the said incisions or the spaces created by making the incisions will be increased materially in the finished corset than what is apparent from a view of Fig. 8. This is more apparent in Fig. 1, which shows the one-half of the finished corset.

*c* represents the bones, and *c'* the strips forming the bone-pockets, and 13 the double-thickness or reinforce strips between the strips *c'* and the fabric *a* at the respective ends of the bone-pockets and shown in Fig. 1 by dotted lines and in Fig. 4 in full lines.

In the manufacture of the corset the parts 2, 3, 4, 5, and 6 are preferably cut of substantially the outline illustrated and are sewed together at their meeting edges, as shown in part in Fig. 5, the part 6 being shown separate from the connected parts, Fig. 5, because of the difficulty of drawing an adequate illustration. After these parts are all connected by sewing the parts 7 and 8 of the fabric *b*, with the edges folded upon the dotted lines 10, are laid upon and connected to the light-weight fabric *a* at their proper places, the one with reference to the other, and the parts are permanently connected by edge and adjacent lines of sewing 11 12, which lines of sewing connect the parts around the folded edges of the incisions of the parts 7 and 8, the folds on the parts 7 and 8 being made by hand or by machinery before the parts are connected. The lines of sewing 11 and 12 not only connect the folded edges of said parts to the light-weight fabric, but connect the overlying fabric to the said fabric and the overlapping parts of the folds down to place adjacent to the extreme ends of the series of fingers.

In securing the bones the strips forming the bone-pockets have folded edges, and three parallel adjacent lines of sewing 14 (see Figs. 1 and 2) are employed for connecting the strips *c'* and holding the bones in place, these lines of sewing at the same time passing through both the light-weight fabric and the overlying fabric and forming additional lines of sewing for connecting the two fabrics together.

From Figs. 1, 2, 3, and 4 it will be noticed that the overlying fabric *b* is substantially continuous at the waist-line to withstand strain and use and that the portions thereof that extend upward and downward as series of fingers come only at the places where bones are required for vertical stiffness and at which places the said series of fingers are continuations of the heavier overlying fabric and assist the bones and bone-pocket strips in providing the necessary vertical stiffness and support in the corset, while between these series of fingers the light-weight fabric is the only fabric in evidence, the same serving to preserve the contour of the corset and yielding readily in the corset-form to the form of the wearer, and it will be further noticed that the bones and bone-pockets are on the under surface of the light-weight fabric and are not exposed or placed upon the outer surface of the corset. Therefore the outer surface is comparatively smooth and does not interfere with the close fitting of the outer garments.

I do not limit myself to the number of shaped connected parts forming the single-ply light-weight fabric or to the shape of the parts or to making the fabric continuous between the top and bottom edges, as there may be an upper and lower set of shaped connected parts whose adjacent edges follow the waist-line and come directly beneath the continuous waist portion of the overlying heavy fabric *b* and are preferably covered and strengthened by a strip or tape 15. I have indicated in Figs. 5 and 7 by the dotted lines 16 17 the division of the connected parts 2, 3, 4, and 5 into upper and lower sets, and these parts may be further divided to simply fill the V-shaped gores in the heavier fabric. This latitude for the parts composing the corset is desirable, because the central strain is principally on the upper fabric, while the upper and lower strains are upon the light-weight fabric or under parts.

I do not limit myself to the number of bones or bone-pockets employed or to the number of lines of sewing used in connecting the same to the fabric. I also do not limit myself to the use of the reinforce-strips 13, as it may develop that the inwardly-folded parts of the series of fingers, together with the other adjacent portions of fabric, will provide ample stiffness and strength at the ends of and over the bones.

I claim as my invention—

1. A corset comprising a substantial fabric continuous around the waist-line with intervening gore-incisions and having a series of upward and a series of downward fingers above and below the continuous waist-line, the bases of the upward and downward fingers being opposite at the waist-line, and a fabric extended across and back of and filling the gore-apertures and secured to the back of the fingers, and stiffeners applied to opposite fingers and the intervening portion of the waist-line.

2. A corset comprising a substantial fabric continuous around the waist-line with intervening gore-incisions and having a series of upward and a series of downward fingers above and below the continuous waist-line, the bases of the upward and downward fingers being opposite at the waist-line, so that the fingers of the series are in line between the top and bottom edges of the corset, and a fabric extending across and back of and filling the gore-apertures and secured to the back of the fingers, and stiffeners applied to opposite alined fingers and the intervening portion of the waist-line.

3. A corset comprising a substantial fabric continuous around the waist-line with intervening gore-incisions and having a series of upward and a series of downward fingers above and below the continuous waist-line, the bases of the upward and downward fingers being opposite at the waist-line, and a fabric extended across and back of and filling the gore-apertures and secured to the back of the fingers, and bone-pocket strips and bones therein overlying and connected to the inner surface of the fabric and extending in line with the said fingers between the top and bottom edges of the corsets.

4. A corset comprising a single-ply fabric of shaped parts and overlying and heavier fabric to which the same is connected and continuous around the waist-line and having series of upward and downward fingers above and below said continuous waist-line with intervening V-shaped incisions, said series of fingers having edge folded portions turned inward against the fabric body and the parts connected by edge lines of sewing and devices connected to said parts for stiffening the same vertically, substantially as set forth.

5. A corset comprising a single-ply fabric of shaped parts and overlying and heavier fabric to which the same is connected and continuous around the waist-line and having series of upward and downward fingers above and below said continuous waist-line with intervening V-shaped incisions, said series of fingers having edge folded portions turned inward against the fabric body and the parts connected by edge lines of sewing, and adjacent bones and bone-pocket strips overlying the inner surface of the fabric body and in line with the series of fingers and connected to the said fabric parts, substantially as set forth.

6. A corset, each portion of which comprises a fabric body of shaped connected parts 2, 3, 4, 5, and 6 forming approximately half of said corset portion, and an overlying heavier fabric composed of a main part 7 and a connected gore part 8, said parts having lines of incision in from the upper and lower edges dividing the same into series of upward and downward fingers between which the incisions are of V shape, edge lines of sewing for connecting the parts and bones and bone-pocket strips secured to the fabric body and the overlying fabric upon the inner surface of the fabric body and extending vertically upon the series of upward and downward fingers, substantially as set forth.

7. A corset, each portion of which comprises a light-weight-fabric body of shaped connected parts 2, 3, 4, 5 and 6 forming approximately half of said corset portion, and an overlying heavier fabric composed of a main part 7 and a connected gore part 8, said parts having lines of incision in from the upper and lower edges dividing the same into series of upward and downward fingers between which the incisions are of V shape, the adjacent edges of the fabric being folded inward upon the light-weight-fabric body, edge and parallel adjacent lines of sewing extending all around the edges of said series of fingers for connecting the fabric portions and holding the edge folds in position, the folds at the extreme ends constituting a double thickness of the outer fabric at the ends of the series of fingers, and bones and bone-pocket strips connected to the said fabrics for stiffening the corset, substantially as set forth.

8. A corset, each portion of which comprises a light-weight-fabric body of shaped connected parts 2, 3, 4, 5 and 6 forming approximately half of said corset portion, and an overlying heavier fabric composed of a main part 7 and a connected gore part 8, said parts having lines of incision in from the upper and lower edges dividing the same into series of upward and downward fingers between which the incisions are of V shape, the adjacent edges of the fabric being folded inward upon the light-weight-fabric body, edge and parallel adjacent lines of sewing extending all around the edges of said series of fingers for connecting the fabric portions and holding the edge folds in position, the folds at the extreme ends constituting a double thickness of the outer fabric at the ends of the series of fingers, and pairs of bones and bone-pocket strips overlying the same upon the inner surface of the corset, that is, the surface of the light-weight-fabric body, extending vertically of the corset across the waist portion and upon the series of upward and downward fingers and connected thereto by three parallel lines of sewing which pass through all the thicknesses of fabric and at the same time assist in connecting the parts together, substantially as set forth.

9. A corset comprising a single-ply-fabric body of shaped connected parts and overlying and heavier fabric connected thereto and composed of a main part 7 and a connected gore part 8, said parts having lines of incision in from the upper and lower edges dividing the same into series of upward and downward fingers between which the incisions are of V shape, said series of fingers having edge folded portions turned inward against the fabric body, and the parts connected by edge lines of sewing, and bones and bone-pocket strips overlying the inner surface of the fabric body and in line with the series of fingers and secured to the fabric, substantially as set forth.

10. A corset comprising a single-ply fabric of shaped parts and an overlying and heavier fabric to which the same is connected and continuous around the waist-line to provide for the central and circumferential strain, and having therein series of upward and downward fingers above and below said continuous waist-line between which are intervening V-shaped incisions and the parts connected by edge lines of sewing, and devices connected to said parts for stiffening the said finger parts vertically, the single-ply fabric between the said fingers carrying the upper and lower circumferential strains, substantially as specified.

Signed this 8th day of July, 1902.

DANIEL KOPS.

Witnesses:

GEO. T. PINCKNEY,

S. T. HAVILAND.